US012265640B2

(12) United States Patent
Dintenfass et al.

(10) Patent No.: US 12,265,640 B2
(45) Date of Patent: Apr. 1, 2025

(54) SYSTEM AND METHOD FOR CONTROLLING RESOURCES USING PARALLEL COMPUTING DEVICES

(71) Applicant: BANK OF AMERICA CORPORATION, Charlotte, NC (US)

(72) Inventors: Katherine Kei-Zen Dintenfass, Lincoln, RI (US); Sandra Ann Breece, Mooresville, NC (US); Karen Lea MacQueen, Lyndhurst, OH (US); Melissa Christine Derville Hart, Cornelius, NC (US); Robert Nyeland Huggins, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 274 days.

(21) Appl. No.: 17/902,179

(22) Filed: Sep. 2, 2022

(65) Prior Publication Data

US 2024/0078328 A1 Mar. 7, 2024

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 2221/2141* (2013.01)

(58) Field of Classification Search
CPC ............... G06F 21/6218; G06F 21/604; G06F 2221/2141
USPC ............................................. 726/27; 709/229
See application file for complete search history.

(56) References Cited

U.S. PATENT DOCUMENTS

| 8,010,992 | B1 * | 8/2011 | Chang ................... H04L 67/567 726/1 |
| 8,904,181 | B1 | 12/2014 | Felsher |
| 8,914,840 | B2 | 12/2014 | Reisman |
| 8,935,399 | B2 | 1/2015 | Rajan |
| 8,972,943 | B2 | 3/2015 | Papakipos |

(Continued)

OTHER PUBLICATIONS

Ashley Ferraro, "Spend Control—Take Control of Your Kids' Spending Habits", Jul. 28, 2022, pp. 1-14, https://privacy.com/blog/spend-control/ (Year: 2022).*

*Primary Examiner* — Liang Che A Wang
(74) *Attorney, Agent, or Firm* — Moore & Van Allen PLLC; Nicholas C. Russell

(57) ABSTRACT

A system is provided for controlling resources using parallel computing devices. In particular, the system may comprise one or more applications installed across one or more computing devices, where the one or more applications may be configured to control resource transfers. Certain applications may be configured such that one application, such as a primary application, may implement one or more controls or restrictions on resource transfers that may be executed by another application, or a secondary application. The primary application may further be configured to monitor the secondary application to retrieve various types of data from the secondary application, such as resource transfer metrics data. The system may be configured to, based on the data associated with the secondary application, generate one or more resource-related projections with respect to the secondary application. In this way, the system provides an efficient way to control resource transfers across parallel computing devices.

17 Claims, 4 Drawing Sheets

(56) References Cited

U.S. PATENT DOCUMENTS

| | | |
|---|---|---|
| 9,143,909 B2 | 9/2015 | Kumar |
| 9,497,264 B2 | 11/2016 | Miloushev |
| 9,607,355 B2 | 3/2017 | Zou |
| 9,609,020 B2 | 3/2017 | White |
| 9,749,148 B2 | 8/2017 | Cj |
| 9,773,107 B2 | 9/2017 | White |
| 9,866,463 B2 | 1/2018 | Raja |
| 10,067,796 B1 | 9/2018 | Metcalf |
| 10,110,617 B2 | 10/2018 | Muddu |
| 10,235,439 B2 | 3/2019 | Sullivan |
| 10,241,831 B2 | 3/2019 | Harris |
| 10,521,357 B1 | 12/2019 | Ramey |
| 10,846,136 B2 | 11/2020 | Muthiah |
| 10,948,887 B2 | 3/2021 | Gardner |
| 11,055,521 B2 | 7/2021 | Chandler |
| 2011/0307377 A1* | 12/2011 | Nelsen ................ G06Q 20/348 705/41 |
| 2013/0185137 A1* | 7/2013 | Shafi ..................... G06Q 30/02 705/14.35 |
| 2016/0078481 A1* | 3/2016 | Holland ............ G06Q 30/0267 705/14.55 |
| 2016/0253339 A1 | 9/2016 | Ambrose |
| 2016/0378545 A1 | 12/2016 | Ho |
| 2018/0329747 A1 | 11/2018 | Brown |
| 2018/0349870 A1* | 12/2018 | Sudo ...................... A63F 13/35 |
| 2022/0147970 A1* | 5/2022 | Babcock ............ G06Q 20/4016 |
| 2023/0376964 A1* | 11/2023 | Roundy ............. G06Q 20/4016 |

* cited by examiner

SYSTEM AND METHOD FOR CONTROLLING RESOURCES USING PARALLEL COMPUTING DEVICES

FIELD OF THE INVENTION

The present invention embraces a system for controlling resources using parallel computing devices.

BACKGROUND

There is a need for an efficient way to manage resources across parallel computing devices.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for controlling resources using parallel computing devices. In particular, the system may comprise one or more applications installed across one or more computing devices (e.g., portable devices such as smartphones), where the one or more applications may be configured to control resource transfers. Certain applications may be configured such that one application (e.g., a primary application) may implement one or more controls or restrictions on resource transfers that may be executed by another application (e.g., a secondary application). The primary application may further be configured to monitor the secondary application to retrieve various types of data from the secondary application, such as resource transfer metrics data. The system may be configured to, based on the data associated with the secondary application, generate one or more resource-related projections with respect to the secondary application. In this way, the system provides an efficient way to control resource transfers across parallel computing devices.

Accordingly, embodiments of the present disclosure provide a system for controlling resources using parallel computing devices, the system comprising at least one non-transitory storage device; and at least one processor coupled to the at least one non-transitory storage device, wherein the at least one processor is configured to present, on a first endpoint device, a graphical interface of a first application, wherein the first application is communicatively coupled with a second application installed on a second endpoint device; receive, from the first application, a request to implement one or more resource transfer controls on the second application; implement the one or more resource transfer controls on the second application; transfer resource transfer data associated with the second application from the second endpoint device to the first endpoint device; and based on the resource transfer data, generate one or more resource projections associated with the second application.

In some embodiments, the request to implement one or more resource transfer controls comprises at least one parameter associated with the one or more resource transfer controls, wherein implementing the one or more resource transfer controls on the second application comprises modifying access permissions within the second application based on the request to implement one or more resource transfer controls; detect that a second user associated with the second endpoint device has requested to take a conflicting action that conflicts with at least one parameter associated with the one or more resource transfer controls; and automatically block the conflicting action from being executed within the second application.

In some embodiments, implementing the one or more resource transfer controls further comprises transmitting a notification to the second endpoint device, wherein the notification indicates that the conflicting action has been blocked.

In some embodiments, the conflicting action comprises an action that would exceed the parameter associated with the at least one parameter associated with the one or more resource transfer controls.

In some embodiments, the one or more resource transfer controls comprises at least one of an amount-based restriction, time-based restriction, or frequency-based restriction.

In some embodiments, generating the one or more resource projections comprises detecting that a second user associated with the second application has failed to execute an expected resource transfer; executing a substitute resource transfer through the first application in place of the expected resource transfer; and computing an impact on an account associated with the second user based on detecting that the second user has failed to execute the expected resource transfer.

In some embodiments, the resource transfer data comprises historical resource transfer activity associated with the second application.

Embodiments of the present disclosure also provide a computer program product for controlling resources using parallel computing devices, the computer program product comprising a non-transitory computer-readable medium comprising code causing an apparatus to present, on a first endpoint device, a graphical interface of a first application, wherein the first application is communicatively coupled with a second application installed on a second endpoint device; receive, from the first application, a request to implement one or more resource transfer controls on the second application; implement the one or more resource transfer controls on the second application; transfer resource transfer data associated with the second application from the second endpoint device to the first endpoint device; and based on the resource transfer data, generate one or more resource projections associated with the second application.

In some embodiments, the request to implement one or more resource transfer controls comprises at least one parameter associated with the one or more resource transfer controls, wherein implementing the one or more resource transfer controls on the second application comprises modifying access permissions within the second application based on the request to implement one or more resource transfer controls; detect that a second user associated with the second endpoint device has requested to take a conflicting action that conflicts with at least one parameter associated with the one or more resource transfer controls; and automatically block the conflicting action from being executed within the second application.

In some embodiments, implementing the one or more resource transfer controls further comprises transmitting a notification to the second endpoint device, wherein the notification indicates that the conflicting action has been blocked.

In some embodiments, the conflicting action comprises an action that would exceed the parameter associated with the at least one parameter associated with the one or more resource transfer controls.

In some embodiments, the one or more resource transfer controls comprises at least one of an amount-based restriction, time-based restriction, or frequency-based restriction.

In some embodiments, generating the one or more resource projections comprises detecting that a second user associated with the second application has failed to execute an expected resource transfer; executing a substitute resource transfer through the first application in place of the expected resource transfer; and computing an impact on an account associated with the second user based on detecting that the second user has failed to execute the expected resource transfer.

Embodiments of the present disclosure also provide a computer-implemented method for controlling resources using parallel computing devices, the computer-implemented method comprising presenting, on a first endpoint device, a graphical interface of a first application, wherein the first application is communicatively coupled with a second application installed on a second endpoint device; receiving, from the first application, a request to implement one or more resource transfer controls on the second application; implementing the one or more resource transfer controls on the second application; transferring resource transfer data associated with the second application from the second endpoint device to the first endpoint device; and based on the resource transfer data, generating one or more resource projections associated with the second application.

In some embodiments, the request to implement one or more resource transfer controls comprises at least one parameter associated with the one or more resource transfer controls, wherein implementing the one or more resource transfer controls on the second application comprises modifying access permissions within the second application based on the request to implement one or more resource transfer controls; detect that a second user associated with the second endpoint device has requested to take a conflicting action that conflicts with at least one parameter associated with the one or more resource transfer controls; and automatically block the conflicting action from being executed within the second application.

In some embodiments, implementing the one or more resource transfer controls further comprises transmitting a notification to the second endpoint device, wherein the notification indicates that the conflicting action has been blocked.

In some embodiments, the conflicting action comprises an action that would exceed the parameter associated with the at least one parameter associated with the one or more resource transfer controls.

In some embodiments, the one or more resource transfer controls comprises at least one of an amount-based restriction, time-based restriction, or frequency-based restriction.

In some embodiments, generating the one or more resource projections comprises detecting that a second user associated with the second application has failed to execute an expected resource transfer; executing a substitute resource transfer through the first application in place of the expected resource transfer; and computing an impact on an account associated with the second user based on detecting that the second user has failed to execute the expected resource transfer.

In some embodiments, the resource transfer data comprises historical resource transfer activity associated with the second application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
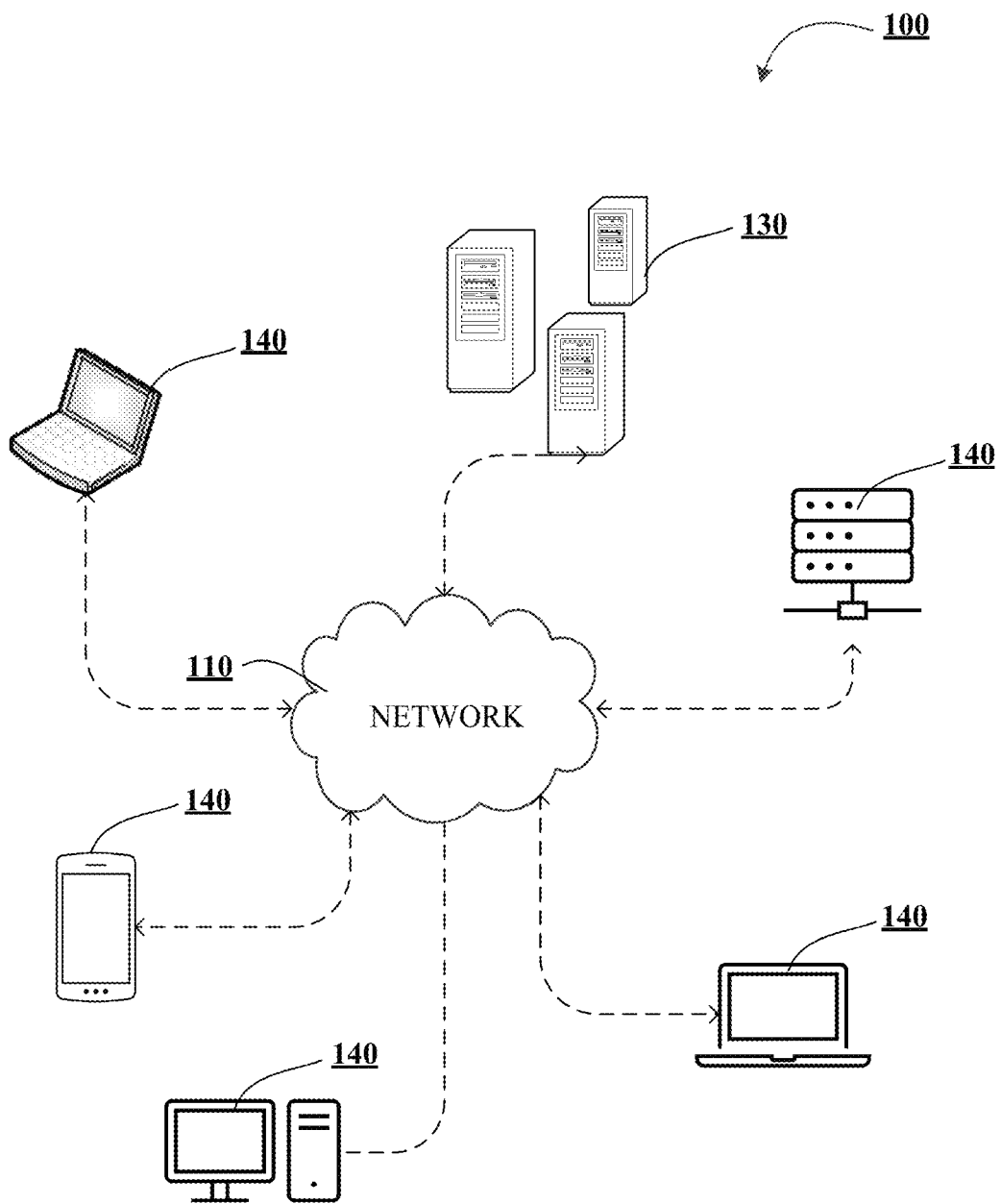
Figure 1B:
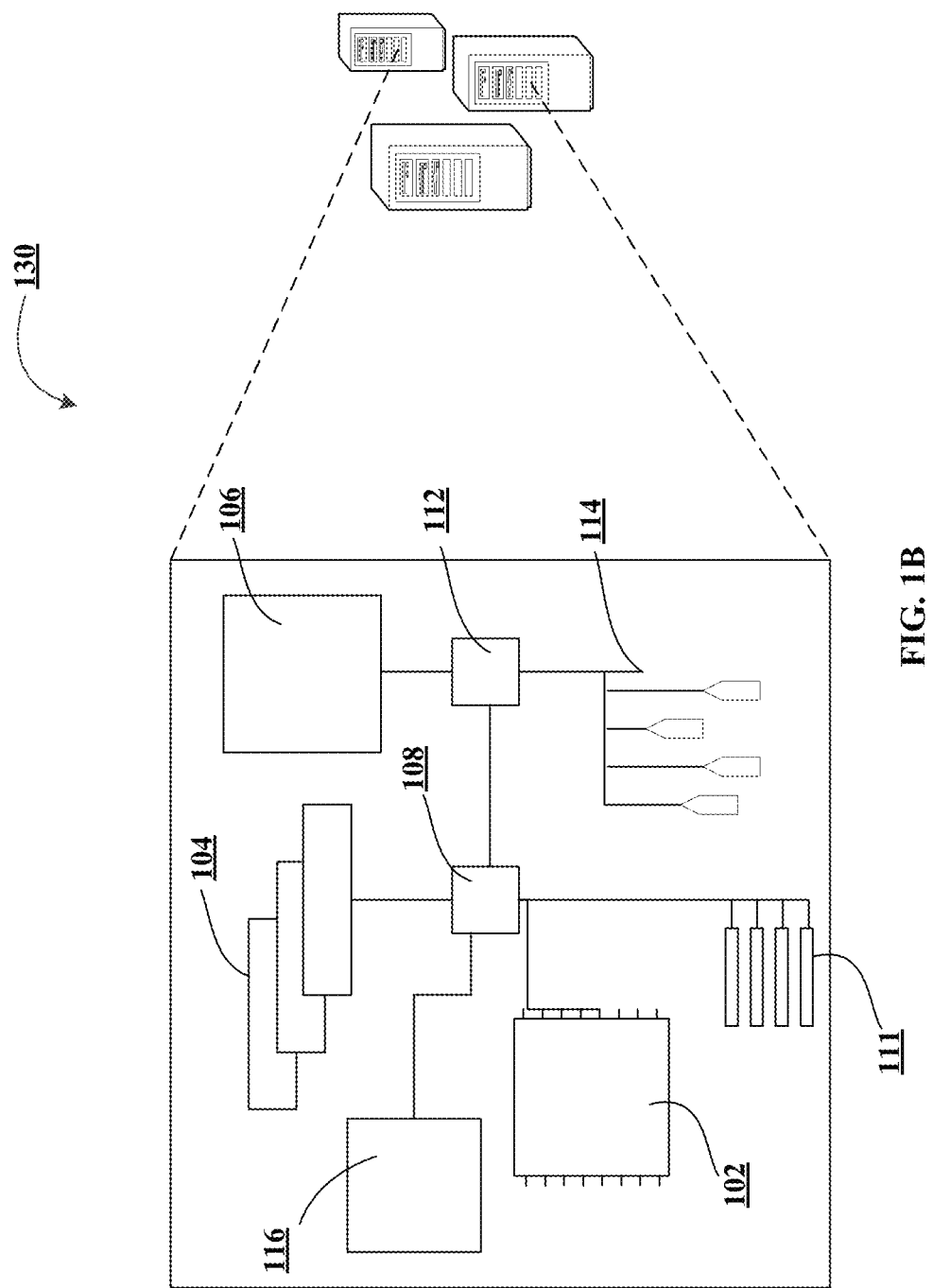
Figure 1C:
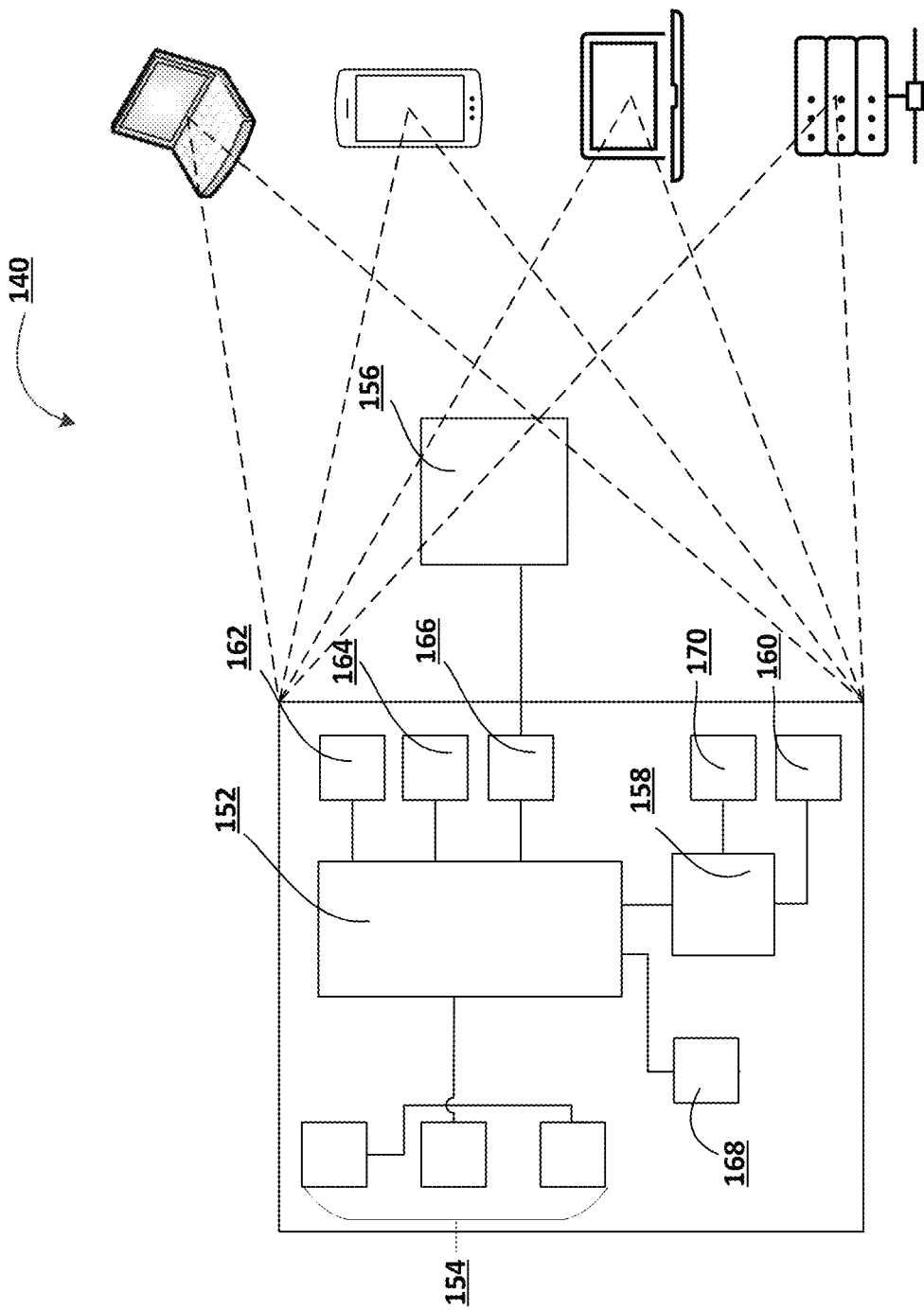
Figure 2:
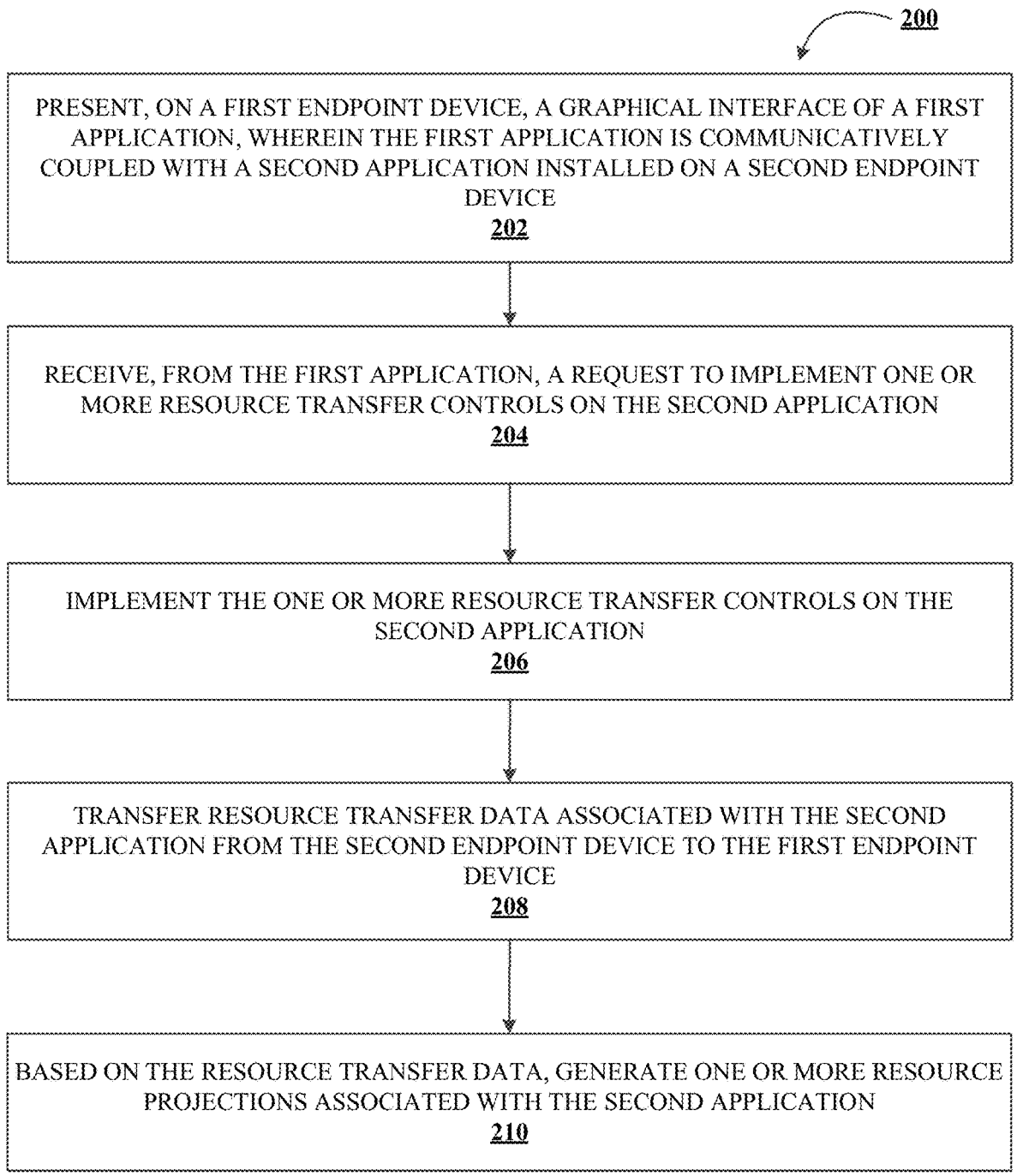

Having thus described embodiments of the invention in general terms, reference will now be made the accompanying drawings, wherein:

FIGS. 1A-1C illustrates technical components of an exemplary distributed computing environment for the system for controlling resources using parallel computing devices, in accordance with an embodiment of the present disclosure;

FIG. 2 illustrates a process flow for controlling resources using parallel computing devices, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user.

Within a network environment, users may use computing devices to execute resource transfers. That said, it may be desirable for a first user to monitor and/or control the transfer of resources executed by a second user. To address the foregoing among other concerns, the present disclosure provides a system for controlling resources using parallel computing devices. In this regard, the system may comprise a primary computing device (e.g., a smartphone or other portable device associated with a first user) having a first application (or "the primary application") installed thereon, and a secondary computing device (e.g., a smartphone associated with a second user) having a second application (or "the secondary application") installed thereon. The primary computing device may be communicatively coupled to the second computing device (e.g., over a network) such that the primary application and the secondary application may share data associated with resource transfers that may be executed on the primary computing device and/or the secondary computing device.

The primary application may allow the first user to specify certain controls or restrictions regarding resource transfers executed by the second user on the second application. Examples of such controls or restrictions may include resource amount limits (e.g., maximum amounts on a per-transfer basis, maximum amounts over a predefined period, or the like), transfer frequency limits, recipient restrictions, category restrictions, timeframe restrictions (e.g., transfers must be completed within a certain time of day), and the like. The first application may further retrieve various types of data and/or metadata related to resource transfers initiated using the second application, where said data and/or metadata may include metrics on resources transfers such as total resource transfer amounts, milestones, usage data, resource transfer categories, and/or the like.

In some embodiments, the system may further be configured to generate resource-related projections based on the resource transfer data associated with the secondary application and/or second user. In this regard, the system may be configured to detect one or more events from the resource transfer data that may affect a resource status associated with the second user. Based on detecting the one or more events, the system may generate a resource simulation which comprises one or more projections regarding changes to the resource status that may occur in response to the one or more events. The resource simulation and/or the projections may be displayed to a graphical interface presented on the first computing device (e.g., via the primary application).

An exemplary embodiment is provided as follows. It should be understood that the following example is provided for illustrative purposes only and is not intended to restrict or limit the scope of the disclosure herein. In an exemplary embodiment, a first user may be a parent or guardian of a second user, where the first user may wish to track and control financial activities (e.g., resource transfers) of the second user. In such a scenario, the system may comprise a first application (or primary application) installed on a smartphone of the first user and a second application (or secondary application) installed on a smartphone of the second user. It should be understood that while this specific embodiment refers to smartphones, it is within the scope of the disclosure for the computing devices described to be another type of computing device (e.g., a wearable computing device such as a smart watch). Accordingly, the primary application may be used by the first user to place various restrictions on financial activities of the second user, such as transaction limits (e.g., transfer amounts on a per-transaction and/or total monthly basis, transaction frequencies on a per-day basis, or the like), categories of purchases or expenditures, restrictions on vendors or service providers, timeframe restrictions (e.g., transactions may only be made during a specified time of day or certain days of the week), and/or the like.

The first application may further provide a mirroring function with respect to the second application such that the first user may view and monitor the actions taken by the second user within the second application. For instance, the first application may be used to track financial activity such as transferring funds into savings, investments, gifts, and/or the like. The system may further allow the first user to track certain milestones with respect to the financial activity of the second user (e.g., an X amount of funds placed into savings). In this regard, the system may be configured to transmit a notification (e.g., a push notification on the first user's smartphone) when certain activities are taken by the second user and/or when certain milestones are reached. For instance, the system may transmit a notification each time the second user has made a deposit into a savings account. In other cases, the system may transmit a notification when the system detects unusual spending activity (e.g., the second user has initiated a resource transfer with a previously unused vendor, the resource transfer amount is unusually large, and/or the like).

The system may further generate projections based on the financial activities of the second user. For instance, if the second user forgets to make a credit payment, the system may automatically withdraw funds from an account associated with the first user while simultaneously generating a projection of how the action (or inaction) would affect a credit associated with the second user. The projection (which may be a numerical value) may be visualized on the first application and/or the second application along with a visual indicator (e.g., green for increases and red for decreases, an up arrow for increases and down arrow for decreases, and the like) to allow for increased usability. In this way, the system provides an efficient and secure way to manage resource transfers across parallel computing devices.

FIGS. 1A-1C illustrate technical components of an exemplary distributed computing environment 100 for the system for controlling resources using parallel computing devices, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for controlling resources using parallel computing devices, in accordance with an embodiment of the present disclosure. The process begins at block 202, where the system presents, on a first endpoint device, a graphical interface of a first application, wherein the first application is communicatively coupled with a second application installed on a second endpoint device. The first endpoint device may be associated with a first user, whereas the second endpoint device may be associated with a second user. The first user may have an established relationship with the second user. For instance, the first user may be a parent or guardian of the second user. In this regard, the first user may use the first application to monitor, track, and/or control the activity taken by the second user within the second application. In an exemplary embodiment, the second application may be an application provided by a financial institution to allow the second user to control resources within an account associated with the second user. In such an embodiment, the first application may be linked to the second application such that the first user may track various resource related activities of the second user (e.g., spending, saving, investing, payments, and/or the like).

The process continues to block 204, where the system receives, from the first application, a request to implement one or more resource transfer controls on the second application. The resource transfer controls may be selected by the first user within the first application, where the resource transfer controls may be configured to place limits or restrictions on the activities taken within the second application and/or the second user. Accordingly, examples of such resource transfer controls may comprise resource restrictions such as amount and/or frequency restrictions on transactions (e.g., the first user wishes to limit the amount of resources that the second user can spend on a per transaction and/or per timeframe basis), time restrictions (e.g., the first user wishes to limit transactions initiated by the second user to a particular time of day), category restrictions (e.g., transactions may be limited to certain vendors and/or certain categories of goods and/or services), and/or the like. In some embodiments, the first user may select from a predefined list of resource transfer controls that may be presented to the first user within a graphical interface presented on the first endpoint device through the first application. In such embodiments, the list of resource transfer controls may be accompanied by one or more interface elements (e.g., clickable or activatable buttons or areas, radio buttons, drop-down lists, text entry fields, and/or the like) which may allow the first user to select the resource transfer controls along with the relevant parameters (e.g., resource amount restrictions may include a numerical "amount" parameter, timeframe restrictions may include a "timeframe" parameter, and/or the like). In other embodiments, the first application may allow the first user to define custom resource transfer controls using the resource transfer data associated with the second application along with one or more functions or logical operators. For instance, the first user may use if and then operators in conjunction with the resource transfer data to automatically execute certain functions with respect to the second application and/or an account associated with the second application and/or the second user (e.g., if the amount of resources in the account associated with the second user exceeds a predefined amount, then transmit a customized notification to the second application).

The process continues to block 206, where the system implements the one or more resource transfer controls on the second application. As described above, the request to implement the one or more resource transfer controls may include a selection of at least one resource transfer control along with one or more parameters and/or functions associated with the selected resource transfer controls. Accordingly, the system may execute the functions associated with the resource transfer control according to the parameters set by the first user. For instance, the first user may limit the second user from executing transactions that exceed five hundred dollars. In such an embodiment, implementing the resource transfer controls may comprise modifying access permissions within the second application to prevent the second user from taking an action within the second application that conflicts with the resource transfer controls. In such an embodiment, the second application may, upon detecting that the second user has requested an activity that conflicts with the resource transfer control, automatically block the requested action from being executed. The second application may further cause a notification to be displayed on the second endpoint device, where the notification may indicate that the second user is not authorized to take the requested action.

The process continues to block 208, where the system transfers resource transfer data associated with the second application from the second endpoint device to the first endpoint device. The resource transfer data may include information about the resource-related activity taken by the second user within the second application. In this regard, the resource transfer data may include information such as the amount of resources in the account associated with the second user, resource transfers initiated and/or received by the second user (which may include amounts of resources spent per resource transfer), timestamps and metadata associated with the resource transfer (e.g., categories of purchases, descriptions of purchases, and/or the like), and/or the like. In this regard, the system may be configured to allow the first user to view when certain milestones have been reached within the second application. For instance, the system may track when the second user has (e.g., through the second application) saved or invested a threshold amount of resources. In some embodiments, the resource transfer data may include information about payments made by the second user (e.g., payments made to a financial institution associated with the second user's account).

The process continues to block 210, where the system, based on the resource transfer data, generates one or more resource projections associated with the second application. The resource projections may be generated using the various types of resource transfer data associated with the second application and/or the second user. Accordingly, in some embodiments, the resource projection may include a computation of a future impact on the account associated with the second user based on the resource transfer activity of the second user. In an exemplary embodiment, linking the first application to the second application may include linking an account of the first user with the account of the second user. Accordingly, upon detecting that the second user has failed to initiate an expected resource transfer (e.g., the second user fails to make a credit payment, such a loan payment, mortgage payment, or the like), the system may automatically initiate a substitute resource transfer from the account associated with the first user to cover the expected resource transfer. The system may then generate a resource projection that shows the impact (e.g., a change to a credit associated with the second user) of the second user's failure to initiate the expected resource transfer. In this way, the system may provide an efficient way to control resource-related activity across parallel computing devices.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for controlling resources using parallel computing devices, the system comprising:
   at least one non-transitory storage device; and
   at least one processor coupled to the at least one non-transitory storage device, wherein the at least one processor is configured to:
   present, on a first endpoint device, a graphical interface of a first application, wherein the first application is communicatively coupled with a second application installed on a second endpoint device;
   receive, from the first application, a request to implement one or more resource transfer controls on the second application;
   implement the one or more resource transfer controls on the second application;
   transfer resource transfer data associated with the second application from the second endpoint device to the first endpoint device; and
   based on the resource transfer data, generate one or more resource projections associated with the second application, wherein generating the one or more resource projections comprises:
   detecting that a second user associated with the second application has failed to execute an expected resource transfer using an account associated with the second user;
   executing a substitute resource transfer using an account associated with a first user using the first application in place of the expected resource transfer associated with the account of the second user; and
   computing an impact on an account associated with the second user based on detecting that the second user has failed to execute the expected resource transfer, wherein the impact presented on the first endpoint device and a second endpoint device as a change in a numerical score associated with the account of the second user.

2. The system of claim 1, wherein the request to implement one or more resource transfer controls comprises at least one parameter associated with the one or more resource transfer controls, wherein implementing the one or more resource transfer controls on the second application comprises:
  modifying access permissions within the second application based on the request to implement one or more resource transfer controls;
  detect that a second user associated with the second endpoint device has requested to take a conflicting action that conflicts with at least one parameter associated with the one or more resource transfer controls; and
  automatically block the conflicting action from being executed within the second application.

3. The system of claim 2, wherein implementing the one or more resource transfer controls further comprises transmitting a notification to the second endpoint device, wherein the notification indicates that the conflicting action has been blocked.

4. The system of claim 2, wherein the conflicting action comprises an action that would exceed the parameter associated with the at least one parameter associated with the one or more resource transfer controls.

5. The system of claim 1, wherein the one or more resource transfer controls comprises at least one of an amount-based restriction, time-based restriction, or frequency-based restriction.

6. The system of claim 1, wherein the resource transfer data comprises historical resource transfer activity associated with the second application.

7. A computer program product for controlling resources using parallel computing devices, the computer program product comprising a non-transitory computer-readable medium comprising code causing an apparatus to:
  present, on a first endpoint device, a graphical interface of a first application, wherein the first application is communicatively coupled with a second application installed on a second endpoint device;
  receive, from the first application, a request to implement one or more resource transfer controls on the second application;
  implement the one or more resource transfer controls on the second application;
  transfer resource transfer data associated with the second application from the second endpoint device to the first endpoint device; and
  based on the resource transfer data, generate one or more resource projections associated with the second application, wherein generating the one or more resource projections comprises:
    detecting that a second user associated with the second application has failed to execute an expected resource transfer using an account associated with the second user;
    executing a substitute resource transfer using an account associated with a first user using the first application in place of the expected resource transfer associated with the account of the second user; and
    computing an impact on an account associated with the second user based on detecting that the second user has failed to execute the expected resource transfer, wherein the impact presented on the first endpoint device and a second endpoint device as a change in a numerical score associated with the account of the second user.

8. The computer program product of claim 7, wherein the request to implement one or more resource transfer controls comprises at least one parameter associated with the one or more resource transfer controls, wherein implementing the one or more resource transfer controls on the second application comprises:
  modifying access permissions within the second application based on the request to implement one or more resource transfer controls;
  detect that a second user associated with the second endpoint device has requested to take a conflicting action that conflicts with at least one parameter associated with the one or more resource transfer controls; and
  automatically block the conflicting action from being executed within the second application.

9. The computer program product of claim 8, wherein implementing the one or more resource transfer controls further comprises transmitting a notification to the second endpoint device, wherein the notification indicates that the conflicting action has been blocked.

10. The computer program product of claim 8, wherein the conflicting action comprises an action that would exceed the parameter associated with the at least one parameter associated with the one or more resource transfer controls.

11. The computer program product of claim 7, wherein the one or more resource transfer controls comprises at least one of an amount-based restriction, time-based restriction, or frequency-based restriction.

12. A computer-implemented method for controlling resources using parallel computing devices, the computer-implemented method comprising:
  presenting, on a first endpoint device, a graphical interface of a first application, wherein the first application is communicatively coupled with a second application installed on a second endpoint device;
  receiving, from the first application, a request to implement one or more resource transfer controls on the second application;
  implementing the one or more resource transfer controls on the second application;
  transferring resource transfer data associated with the second application from the second endpoint device to the first endpoint device; and
  based on the resource transfer data, generating one or more resource projections associated with the second application, wherein generating the one or more resource projections comprises:
    detecting that a second user associated with the second application has failed to execute an expected resource transfer using an account associated with the second user;
    executing a substitute resource transfer using an account associated with a first user using the first application in place of the expected resource transfer associated with the account of the second user; and
    computing an impact on an account associated with the second user based on detecting that the second user has failed to execute the expected resource transfer, wherein the impact presented on the first endpoint device and a second endpoint device as a change in a numerical score associated with the account of the second user.

13. The computer-implemented method of claim 12, wherein the request to implement one or more resource transfer controls comprises at least one parameter associated with the one or more resource transfer controls, wherein implementing the one or more resource transfer controls on the second application comprises:

modifying access permissions within the second application based on the request to implement one or more resource transfer controls;

detect that a second user associated with the second endpoint device has requested to take a conflicting action that conflicts with at least one parameter associated with the one or more resource transfer controls; and automatically block the conflicting action from being executed within the second application.

14. The computer-implemented method of claim 13, wherein implementing the one or more resource transfer controls further comprises transmitting a notification to the second endpoint device, wherein the notification indicates that the conflicting action has been blocked.

15. The computer-implemented method of claim 13, wherein the conflicting action comprises an action that would exceed the parameter associated with the at least one parameter associated with the one or more resource transfer controls.

16. The computer-implemented method of claim 12, wherein the one or more resource transfer controls comprises at least one of an amount-based restriction, time-based restriction, or frequency-based restriction.

17. The computer-implemented method of claim 12, wherein the resource transfer data comprises historical resource transfer activity associated with the second application.

* * * * *